United States Patent [19]

Hong

[11] Patent Number: 5,412,432
[45] Date of Patent: May 2, 1995

[54] APPARATUS AND METHOD FOR ENHANCING TRANSIENT EDGE OF VIDEO SIGNAL

[75] Inventor: Sung H. Hong, Seoul, Rep. of Korea

[73] Assignee: Goldstar Co., Ltd., Seoul, Rep. of Korea

[21] Appl. No.: 160,042

[22] Filed: Nov. 29, 1993

[30] Foreign Application Priority Data

Nov. 30, 1992 [KR] Rep. of Korea .............. 23069/1992
Apr. 28, 1993 [KR] Rep. of Korea .............. 7180/1993
Jul. 22, 1993 [KR] Rep. of Korea .............. 13893/1993

[51] Int. Cl.$^6$ ............................................. H04N 5/21
[52] U.S. Cl. ................................... 348/625; 348/606
[58] Field of Search ............... 348/607, 606, 625, 627, 348/909, 914, 628, 629, 252, 241; 358/166, 167; H04N 5/21, 5/213

[56] References Cited

U.S. PATENT DOCUMENTS 4,847,681 7/1989 Faroudja et al. .

FOREIGN PATENT DOCUMENTS

2251353 7/1992 United Kingdom .

Primary Examiner—James J. Groody
Assistant Examiner—Sherrie Hsia
Attorney, Agent, or Firm—Fliesler, Dubb, Meyer & Lovejoy

[57] ABSTRACT

An apparatus and a method for enhancing a transient edge of a video signal. The apparatus comprises 2n sample delays for sequentially delaying an original pixel value of the video signal inputted therein by one sample and outputting 2n pixel values of the video signal, where n is a positive number, a minimum value filter for obtaining the minimum value of the original pixel value and the 2n−1 pixel values except the nth pixel value, a maximum value filter for obtaining the maximum value of the original pixel value and the 2n−1 pixel values except the nth pixel value, a mean value filter for obtaining the mean value of the original pixel value and the 2n−1 pixel values except the nth pixel value, and a transient edge control circuit for obtaining a difference between the nth pixel value and the mean value, generating an absolute value of the obtained difference, comparing the generated absolute value with a threshold value, discriminating the transient edge of the video signal in accordance with the compared result and enhancing the discriminated transient edge on the basis of the minimum value and the maximum value to reduce a width of the transient edge.

12 Claims, 7 Drawing Sheets

APPARATUS AND METHOD FOR ENHANCING TRANSIENT EDGE OF VIDEO SIGNAL

BACKGROUND OF THE INVENTION

1. Field of the Invention

The present invention relates in general to a television receiver (TV) which is capable of receiving a quadrature-modulated video signal, and more particularly to an apparatus and a method for enhancing a transient edge of a video signal, in which spark noises are detected from the video signal and then removed, so that a high picture quality can be obtained.

2. Description of the Prior Art

Figure 1:
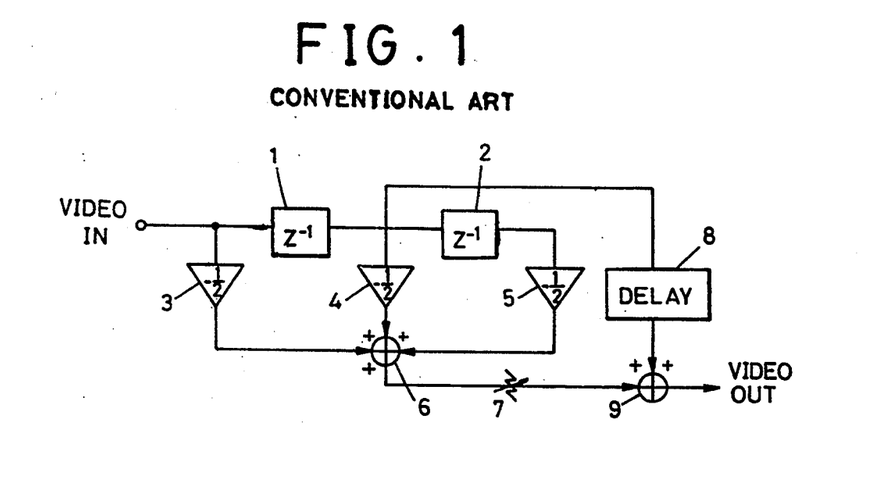
FIG. 1 is a block diagram of a conventional apparatus for enhancing a transient edge of a video signal.

Generally, to obtain a distinct picture in an EDTV or a HDTV, there has been proposed an apparatus for enhancing a transient edge of a video signal One example of this form of apparatus is shown in a block form in FIG. 1, herein.

As shown in FIG. 1, the conventional apparatus for enhancing the transient edge of the video signal comprises delays 1 and 2 for sequentially delaying the video signal input ted therein, amplifiers 3 to 5 for amplifying the original video signal and the video signals delayed by the delays 1 and 2, respectively, an adder 6 for adding output signals from the amplifiers 3 to 5, an attenuator 7 for adjusting a level of an output signal from the adder 6, a delay 8 for delaying the output signal from the delay 1 to match a transmission time thereof with that of an output signal from the attenuator 7, and an adder 9 for adding an output signal from the delay 8 to the output signal from the attenuator 7 and outputting the added signal as the video signal, the transient edge of which is finally enhanced.

The operation of the conventional transient edge enhancement apparatus with the above-mentioned construction will hereinafter be described.

Upon inputting the video signal, the inputted video signal is sequentially delayed by a predetermined time period by the delays 1 and 2. Noticeably, the inputted video signal is enhanced vertically if the delay time of the delays 1 and 2 is a period of one line, while horizontally if the delay time is a period of one sample.

The amplifier 3 amplifies the inputted video signal and then applies the amplified video signal to the adder 6. Also, the video signals sequentially delayed by the delays 1 and 2 are amplified by the amplifies 4 and 5, respectively, and then applied to the adder 6. The output signals from the amplifiers 3 to 5 are added by the adder 6. As a result, the transient edge of the video signal is enhanced by the adder 6.

The output signal from the adder 6 is level-adjusted by the attenuator 7 and then added by the adder 9 to the output signal from the delay 8. As a result, the transient edge of the video signal is finally enhanced by the adder 9.

Figures 2, 3:
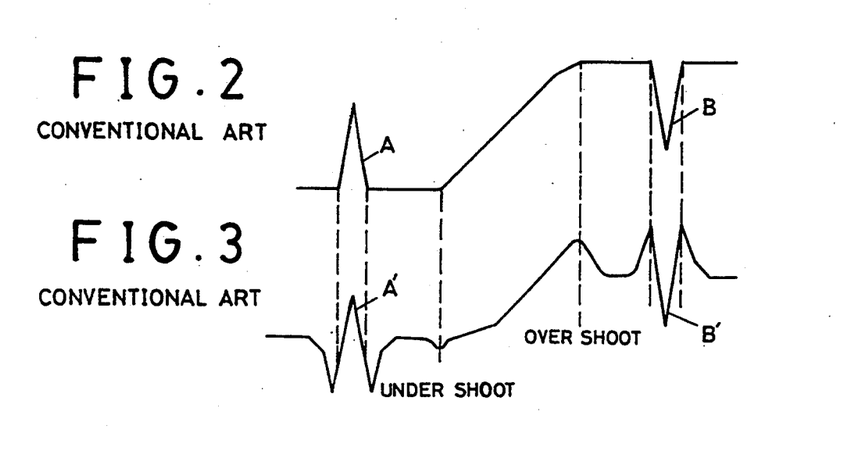
FIG. 2 is a waveform diagram illustrating a general video signal.
FIG. 3 is a waveform diagram illustrating the video signal in FIG. 2 in which a transient edge is enhanced by the conventional transient edge enhancement apparatus in FIG. 1.
Figure 4:
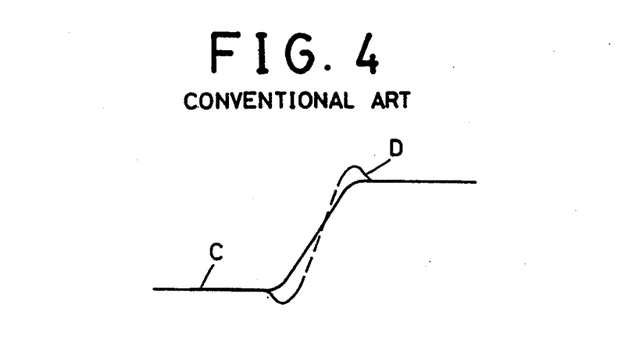
FIG. 4 is a waveform diagram illustrating a human visual characteristic with respect to the enhanced transient edge in FIG. 3.

FIG. 2 is a waveform diagram illustrating a general video signal, FIG. 3 is a waveform diagram illustrating the video signal in FIG. 2 in which the transient edge is enhanced by the conventional transient edge enhancement apparatus and FIG. 4 is a waveform diagram illustrating a human visual characteristic with respect to the enhanced transient edge in FIG. 3.

As mentioned above, the conventional transient edge enhancement apparatus is adapted to enhance the transient edge of the video signal, more particularly luminance and color signals separated from the video signal However, as shown in FIG. 3, in the conventional transient edge enhancement apparatus, the transient edge of the video signal is enhanced together with an over shoot and an under shoot contained therein as shown in FIG. 2. This results in an unnaturalness in a picture quality.

Also, as shown in FIG. 3, in the conventional transient edge enhancement apparatus, the transient edge of the video signal is enhanced together with spark noises A and B contained in the video signal as shown in FIG. 2. This results in a degradation in the picture quality Further, the enhancement on the transient edge is performed regardless of a width of the transient edge. As a result, a high picture quality cannot be obtained because the transient edge is enhanced regardless of different frequency bands of input video signals in various systems such as, for example, a VCR, a HDTV, an EDTV, S-VHS and the like.

SUMMARY OF THE INVENTION

Therefore, the present invention has been made in view of the above problems, and it is an object of the present invention to provide an apparatus and a method for enhancing a transient edge of a video signal, in which the transient edge is enhanced with a width reduced, an over shoot and an under shoot of the transient edge are not enhanced and spark noises are detected from the video signal and then removed, so that a natural video picture and a high picture quality can be obtained.

In accordance with one aspect of the present invention, there is provided an apparatus for enhancing a transient edge of a video signal, comprising sample delay means for sequentially delaying an original pixel value of the video signal inputted therein by one sample and outputting 2n pixel values of the video signal, where n is a positive number; minimum value filtering means for obtaining the minimum value of the original pixel value and the 2n−1 pixel values from said sample delay means except the nth pixel value therefrom; maximum value filtering means for obtaining the maximum value of the original pixel value and the 2n−1 pixel values from said sample delay means except the nth pixel value therefrom; first mean value filtering means for obtaining the mean value of the original pixel value and the 2n−1 pixel values from said sample delay means except the nth pixel value therefrom; and transient edge control means for obtaining a difference between the nth pixel value from said sample delay means and the mean value from said first mean value filtering means, generating an absolute value of the obtained difference, comparing the generated absolute value with a threshold value, discriminating the transient edge of the video signal in accordance with the compared result and enhancing the discriminated transient edge on the basis of the minimum value from said minimum value filtering means and the maximum value from said maximum value filtering means to reduce a width of the transient edge.

In accordance with another aspect of the present invention, there is provided a method of enhancing a transient edge of a video signal, comprising the steps of (a) sequentially delaying an original pixel value of the video signal by one sample to output 2n pixel values of the video signal where n is a positive number, and obtaining the minimum value, the maximum value and the mean value of the original pixel value and the 2n pixel values; and (b) obtaining a difference between the nth pixel value and the mean value obtained at said step (a), generating an absolute value of the obtained difference, comparing the generated absolute value with a threshold value, discriminating the transient edge of the video signal in accordance with the compared result and enhancing the discriminated transient edge on the basis of the minimum value and the maximum value obtained at said step (a) to reduce a width of the transient edge.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 5:
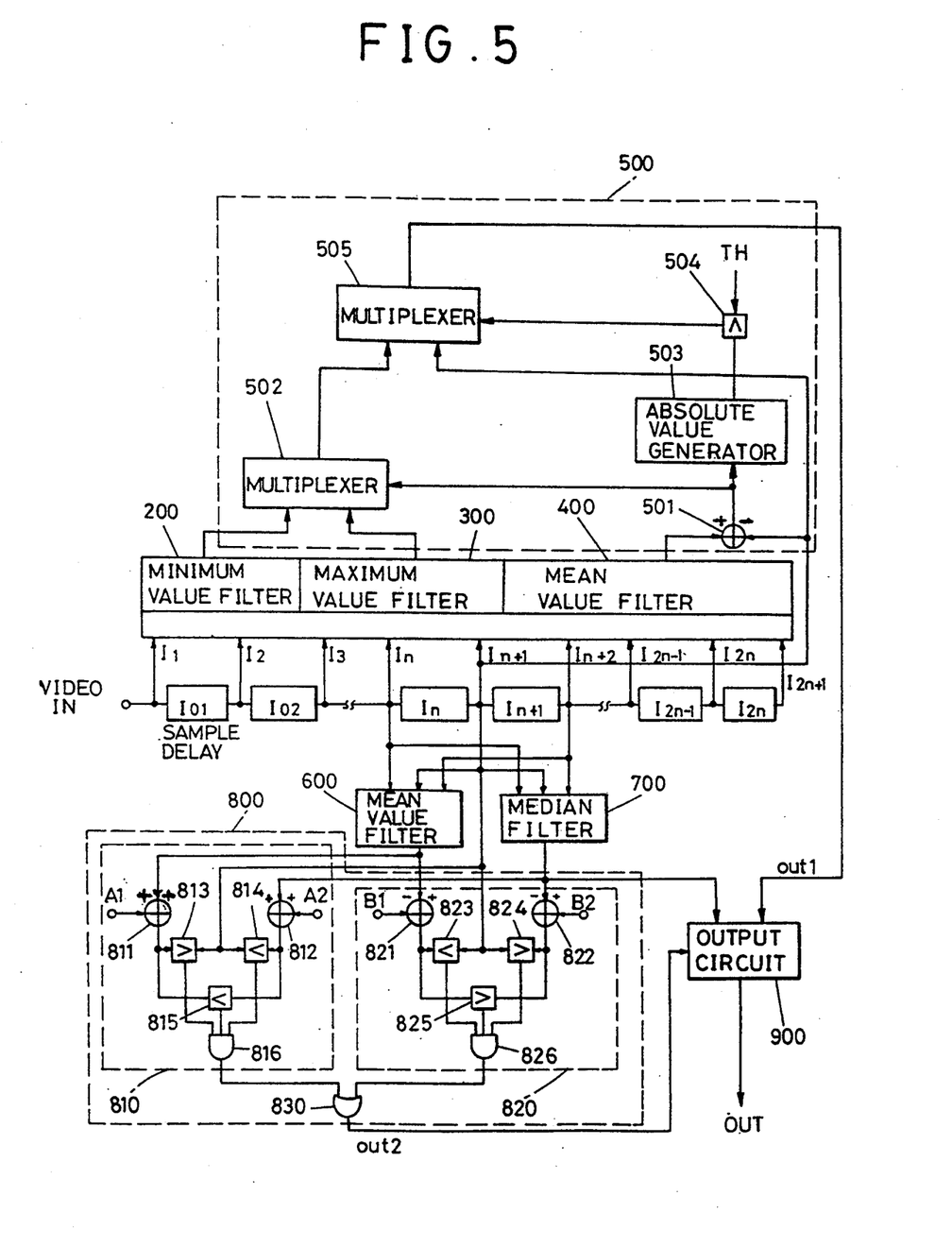
FIG. 5 is a block diagram of an apparatus for enhancing a transient edge of a video signal in accordance with a first embodiment of the present invention.

Referring to FIG. 5 there is shown a block diagram of an apparatus for enhancing a transient edge of a video signal in accordance with a first embodiment of the present invention. As shown in this drawing, the transient edge enhancement apparatus comprises 2n sample delays 101 to 12n for sequentially delaying an original pixel value I1 of the video signal inputted therein by one sample and outputting 2n pixel values I2 to I2n+1 of the video signal, where n is a positive number.

The transient edge enhancement apparatus also comprises a minimum value filter 200 for obtaining the minimum value MIN of the original pixel value I1 and the 2n pixel values I2 to I2+1 from the sample delays 101 to 12n, a maximum value filter 300 for obtaining the maximum value MAX of the original pixel value I1 and the 2n pixel values I2 to I2n+1 from the sample delays 101 to 12n, and a mean value filter 400 for obtaining the mean value MEAN of the original pixel value I1 and the 2n pixel values I2 to I2n+1 from the sample delays 101 to 12n.

A transient edge control circuit 500 is provided in the transient edge enhancement apparatus to obtain a difference between the nth pixel value In+1 from the sample delay In and the mean value MEAN from the mean value filter 400, generate an absolute value of the obtained difference, compare the generated absolute value with a threshold value TH, discriminate the transient edge of the video signal in accordance with the compared result and enhance the discriminated transient edge on the basis of the minimum value MIN from the minimum value filter 200 and the maximum value MAX from the maximum value filter 300 to reduce a width of the transient edge.

A mean value filter 600 is also provided in the transient edge enhancement apparatus to obtain the mean value MEAN3 of the nth pixel value In+1 from the sample delay In and the adjacent pixel values In and In+2.

A median filter 700 is also provided in the transient edge enhancement apparatus to obtain a median MEDIAN3 of the nth pixel value In+1 from the sample delay In and the adjacent pixel values In and In+2.

A noise removal control circuit 800 is also provided in the transient edge enhancement apparatus to perform a comparison operation of the mean value MEAN3 from the mean value filter 600, the median MEDIAN3 from the median filter 700 and the nth pixel value In+1 from the sample delay in with respect to a plurality of constants A1, A2, B1 and B2, discriminate spark noises from the video signal in accordance with the compared result and remove the discriminated spark noises.

An output circuit 900 is also provided in the transient edge enhancement apparatus to selectively output one of an output value out1 from the transient edge control circuit 500 and the median MEDIAN3 from the median filter 700 in response to an output signal out2 from the noise removal control circuit 800. The output circuit 900 is provided with a multiplexer.

The transient edge control circuit 500 includes a subtracter 501 for subtracting the nth pixel value In+1 from the sample delay In from the mean value MEAN from the mean value filter 400, a multiplexer 502 for selecting one of the minimum value MIN from the minimum value filter 200 and the maximum value MAX From the maximum value filter 300 according to a sign of an output value from the subtracter 501, an absolute value generator 503 for generating an absolute value of the output value from the subtracter 501, a comparator 504 for comparing the absolute value from the absolute value generator 503 with the threshold value TH, and a multiplexer 508 for selecting one of the nth pixel value In+1 from the sample delay In and an output value from the multiplexer 502 in response to an output signal from the comparator 504.

The noise removal control circuit 800 includes a first comparison circuit 810 for performing the comparison operation of the mean value MEAN3 from the mean value filter 600, the median MEDIAN3 from the median filter 700 and the nth pixel value In+1 from the sample delay in with respect to the constants A1 and A2, a second comparison circuit 820 for performing the comparison operation of the mean value MEAN3 from the mean value filter 600, the median MEDIAN3 from the median filter 700 and the nth pixel value In+1 from the sample delay In with respect to the constants B1 and B2, and a logical output unit 830 for logically combining output signals from the first and second comparison circuits 810 and 820.

The first comparison circuit 810 includes an adder 811 for adding the constant A1 from the mean value MEAN3 from the mean value filter 600, an adder 812 for adding the constant A2 from the median MEDIAN3 from the median filter 700, a comparator 813 for comparing an output value from the adder 811 with the nth pixel value In+1 from the sample delay in, a comparator 814 for comparing an output value from the adder 812 with the nth pixel value In+1 from the sample delay In, a comparator 815 for comparing the output values from the adders 811 and 812 with each other, and an AND gate 816 for ANDing output signals from the comparators 813 to 815.

The second comparison circuit 820 includes a subtracter 821 for subtracting the constant B1 from the mean value MEAN3 from the mean value filter 600, a subtracter 822 for subtracting the constant B2 from the median MEDIAN3 from the median filter 700, a comparator 823 for comparing an output value from the subtracter 821 with the nth pixel value In+1 from the sample delay In, a comparator 824 for comparing an output value from the subtracter 822 with the nth pixel value In+1 from the sample delay In, a comparator 825 for comparing the output values from the subtracters 821 and 822 with each other, and an AND gate 826 for ANDing output signals from the comparators 823 to 825.

The logical output unit 830 is provided with an OR gate for ORing output signals from the AND gates 816 and 826 in the first and second comparison circuits 810 and 820.

The operation of the transient edge enhancement apparatus with the above-mentioned construction in accordance with the first embodiment of the present invention will hereinafter be described in detail with reference to FIGS. 5 to 10.

Figure 6:
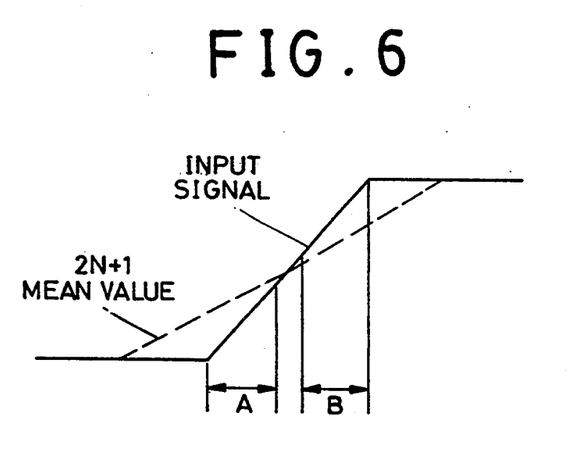
FIG. 6 is a waveform diagram illustrating a video signal which is applied to the first embodiment of the present invention.
Figure 7:
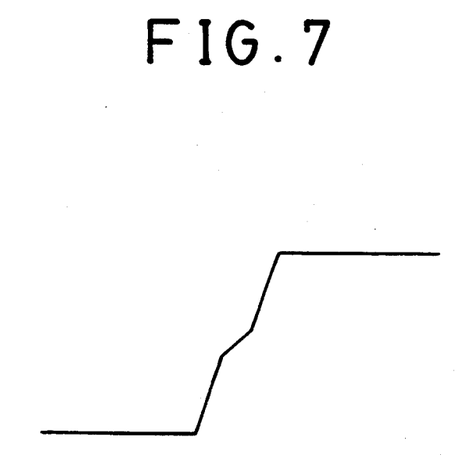
FIG. 7 is a waveform diagram illustrating the video signal in FIG. 6 in which a transient edge is enhanced by the transient edge enhancement apparatus in FIG. 5.
Figure 8:
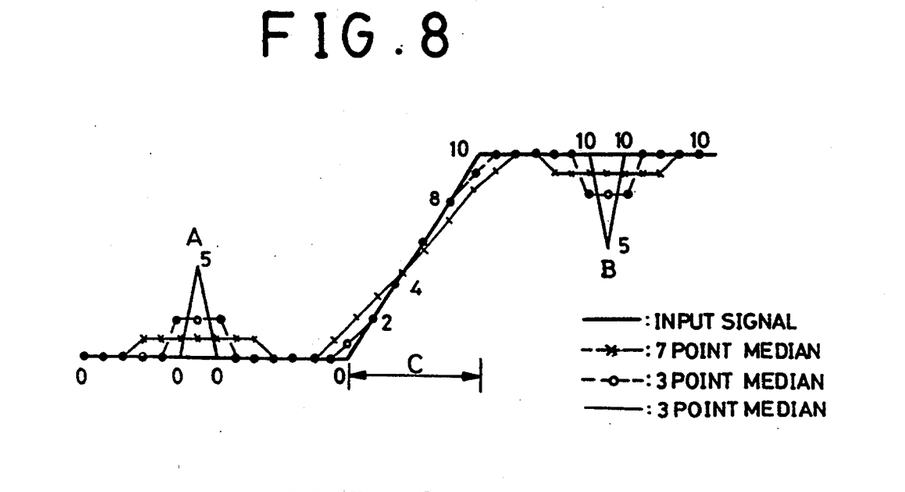
FIG. 8 is a waveform diagram illustrating pixel values of a video signal which is applied to the first embodiment of the present invention.
Figure 9:
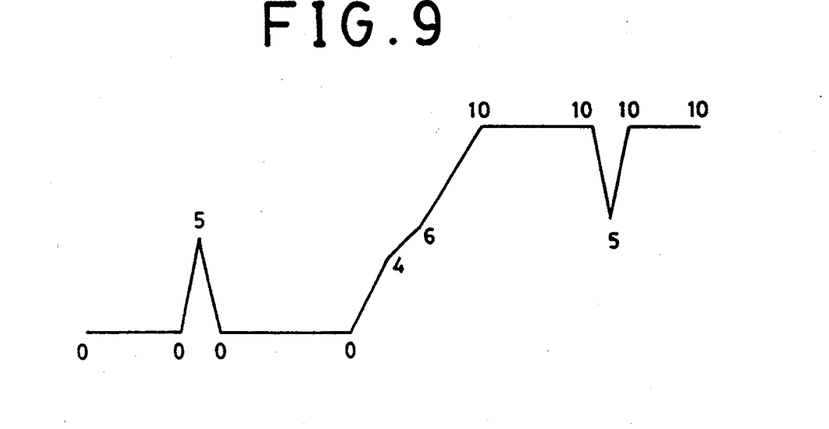
FIG. 9 is a waveform diagram illustrating pixel values of the video signal in FIG. 8 in which a transient edge is enhanced by the transient edge enhancement apparatus in FIG. 5.
Figure 10:
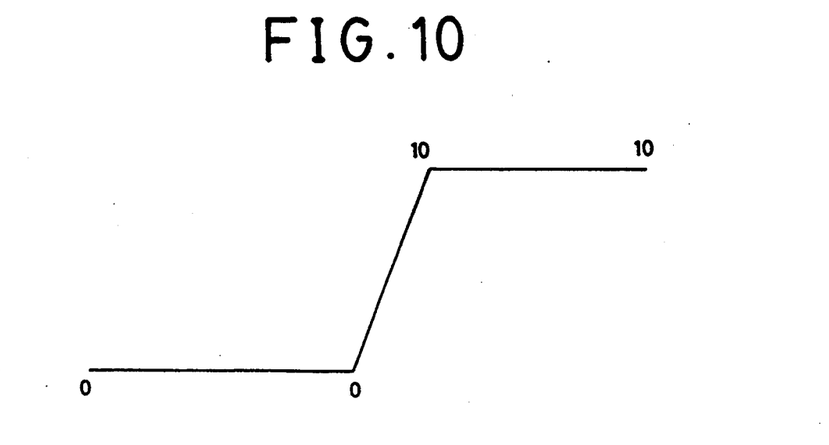
FIG. 10 is a waveform diagram illustrating the video signal in FIG. 8 in which spark noises are removed by the transient edge enhancement apparatus in FIG. 5.

FIG. 6 is a waveform diagram illustrating a video signal which is applied to the first embodiment of the present invention, FIG. 7 is a waveform diagram illustrating the video signal in FIG. 6 in which a transient edge is enhanced by the transient edge enhancement apparatus in FIG. 5, FIG. 8 is a waveform diagram illustrating pixel values of a video signal which is applied to the first embodiment of the present invention, FIG. 9 is a waveform diagram illustrating pixel values of the video signal in FIG. 8 in which a transient edge is enhanced by the transient edge enhancement apparatus in FIG. 5, and FIG. 10 is a waveform diagram illustrating the video signal in FIG. 8 in which spark noises are removed by the transient edge enhancement apparatus in FIG. 5.

First, upon receiving the video signal, the 2n sample delays 101 to 12n sequentially delay the original pixel value I1 of the received video signal by one sample and output the 2n pixel values I2 to I2n+1 of the video signal, where n is the positive number. The minimum value filter 200 obtains the minimum value MIN of the original pixel value I1 and the 2n pixel values I2 to I2n+1 from the sample delays 101 to 12n. The maximum value filter 300 obtains the maximum value MAX of the original pixel value I1 and the 2n pixel values I2 to I2n+1 from the sample delays 101 to 12n. The mean value filter 400 obtains the mean value MEAN of the original pixel value I1 and the 2n pixel values I2 to I2n+1 from the sample delays 101 to 12n. The nth pixel value In+1 from the sample delay In, the minimum value MIN from the minimum value filter 200, the maximum value MAX from the maximum value filter 300 and the mean value MEAN from the mean value filter 400 are applied to the transient edge control circuit 500.

In the transient edge control circuit 500, the subtracter 501 subtracts the nth pixel value In+1 from the sample delay In from the mean value MEAN from the mean value filter 400 and the multiplexer 502 selects one of the minimum value MIN from the minimum value filter 200 and the maximum value MAX from the maximum value filter 300 according to the sign of the output value from the subtracter 501. Namely, when the mean value MEAN from the mean value filter 400 is greater than the nth pixel value In+1 from the sample delay In as in a region A of FIG. 6, the multiplexer 502 selects the minimum value MIN from the minimum value filter 200 according to the plus (+) sign of the output value from the subtracter 501. On the contrary, when the mean value MEAN from the mean value filter 400 is not greater than the nth pixel value In+1 from the sample delay in as in a region B of FIG. 6, the multiplexer 502 selects the maximum value MAX from the maximum value filter 300 according to the minus (−) sign of the output value from the subtracter 501. In this manner, the transient edge to be enhanced is reduced in width as shown in FIG. 7.

The absolute value of the output value from the subtracter 501 is obtained by the absolute value generator 503 and then compared with the threshold value TH by the comparator 504. The multiplexer 505 selects one of the nth pixel value In+1 from the sample delay In and the output value from the multiplexer 502 in response to the output signal from the comparator 504. Namely, if $|MEAN-In+1|<TH$, the output value out1 from the multiplexer 505 is the nth pixel value In+1 from the sample delay ln. Also, if $|MEAN-In+1|>TH$ and In+1>MEAN, the output value out1 from the multiplexer 505 is the maximum value MAX from the maximum value filter 300. Also, if $|MEAN-In+1|>TH$ and In+1<MEAN, the output value out1 from the multiplexer 505 is the minimum value MIN from the minimum value filter 200.

In other words, in the case where the video signal has a window size of 7 as shown in FIG. 8, the transient edge thereof is enhanced with the width reduced as shown in FIG. 9.

On the other hand, the mean value filter 600 obtains the mean value MEAN3 of the nth pixel value In+1 from the sample delay In and the adjacent pixel values In and In+2. The median filter 700 obtains the median MEDIAN3 of the nth pixel value In+1 from the sample delay In and the adjacent pixel values In and In+2. The nth pixel value In+1 from the sample delay ln, the mean value MEAN3 from the mean value filter 600 and the median MEDIAN3 from the median filter 700 are applied to the noise removal control circuit 800.

The noise removal control circuit 800 is adapted to discriminate the spark noises from the video signal by discriminating whether the nth pixel value In+1 from the sample delay In, the mean value MEAN3 from the mean value filter 600 and the median MEDIAN3 from the median filter 700 satisfy the following equation:

$$In+1 > MEAN+A1 > MEDIAN3+A2 \text{ or}$$
$$IN+1 < MEAN3-B1 < MEDIAN3-B2.$$

Namely, in the first comparison circuit 810 of the noise removal control circuit 800, the adder 811 adds the constant A1 from the mean value MEAN3 from the mean value filter 600 and the adder 812 adds the constant A2 from the median MEDIAN3 from the median filter 700. The comparator 813 compares the output value from the adder 811 with the nth pixel value In+1 from the sample delay In and the comparator 814 compares the output value from the adder 812 with the nth pixel value In+1 from the sample delay ln. The output values from the adders 811 and 812 are also compared with each other by the comparator 815. If MEAN3+A1<In+1, the comparator 813 outputs a high signal. If MEDIAN3+A2<In+1, the comparator 814 outputs a high signal. Also, if MEAN3+A1>MEDIAN3+A2, the comparator 815 outputs a high signal. The output signals from the comparators 813 to 815 are ANDed by the AND gate 816. If the nth pixel value In+1 from the sample delay ln, the mean value MEAN3 from the mean value filter 800 and the median MEDIAN3 from the median filter 700 satisfy the equation In+1>MEAN3+A1>MEDIAN3+A2, the AND gate 816 outputs a high signal.

Similarly, in the second comparison circuit 820 of the noise removal control circuit 800, the subtracter 821 subtracts the constant B1 from the mean value MEAN3 from the mean value filter 600 and the subtracter 822 subtracts the constant B2 from the median MEDIAN3 from the median filter 700. The comparator 823 compares the output value from the subtracter 821 with the nth pixel value In+1 from the sample delay In and the comparator 824 compares the output value from the subtracter 822 with the nth pixel value In+1 from the sample delay ln. The output values from the subtracters 821 and 822 are also compared with each other by the comparator 825. The output signals from the comparators 823 to 825 are ANDed by the AND gate 826. If the nth pixel value In+1 from the sample delay ln, the mean value MEAN3 from the mean value filter 600 and the median MEDIAN3 from the median filter 700 satisfy the equation In+1<MEAN3−B1<MEDIAN3−B2, the AND gate 826 outputs a high signal.

The output signals from the AND gates 816 and 826 in the first and second comparison circuits 810 and 820 are ORed by the OR gate of the logical output unit 830. If the nth pixel value In+1 from the sample delay ln, the mean value MEAN3 from the mean value filter 600 and the median MEDIAN3 from the median filter 700 satisfy the equation In+1>MEAN3+A1>MEDIAN3+A2 or In+1<MEAN3−B1<MEDIAN3−B2, the logical output unit 830 outputs a high signal.

The output signal out2 from the logical output unit 830 in the noise removal control circuit 800 is applied to the multiplexer of the output circuit 900. The output circuit 900 is adapted to selectively output one of the output value out1 from the transient edge control circuit 500 and the median MEDIAN3 from the median filter 700 in response to the output signal out2 from the noise removal control circuit 800.

Namely, if the nth pixel value In+1 from the sample delay ln, the mean value MEAN3 from the mean value filter 800 and the median MEDIAN3 from the median filter 700 satisfy the equation In+1>MEAN3+A1>MEDIAN3+A2 or In+1<MEAN3−B1<MEDIAN3−B2 as a result of the comparison of the first and second comparison circuits 810 and 820, it is discriminated that the spark noises A and B are present in the video signal as shown in FIG. 8. As a result, the logical output unit 830 outputs the high signal In response to the high signal from the logical output unit 830, the output circuit 900 outputs the median MEDIAN3 from the median filter 700 to remove the spark noises A and B from the video signal. Therefore, outputted from the output circuit 900 is the median MEDIAN3 from the median filter 700 as the video signal in which the spark noises are removed as shown in FIG. 10. On the contrary, receiving a low signal from the logical output unit 830, the output circuit 900 outputs the output value out1 from the transient edge control circuit 800 as the video signal in which the transient edge is enhanced with the width reduced as shown in FIG. 9.

Figure 11:
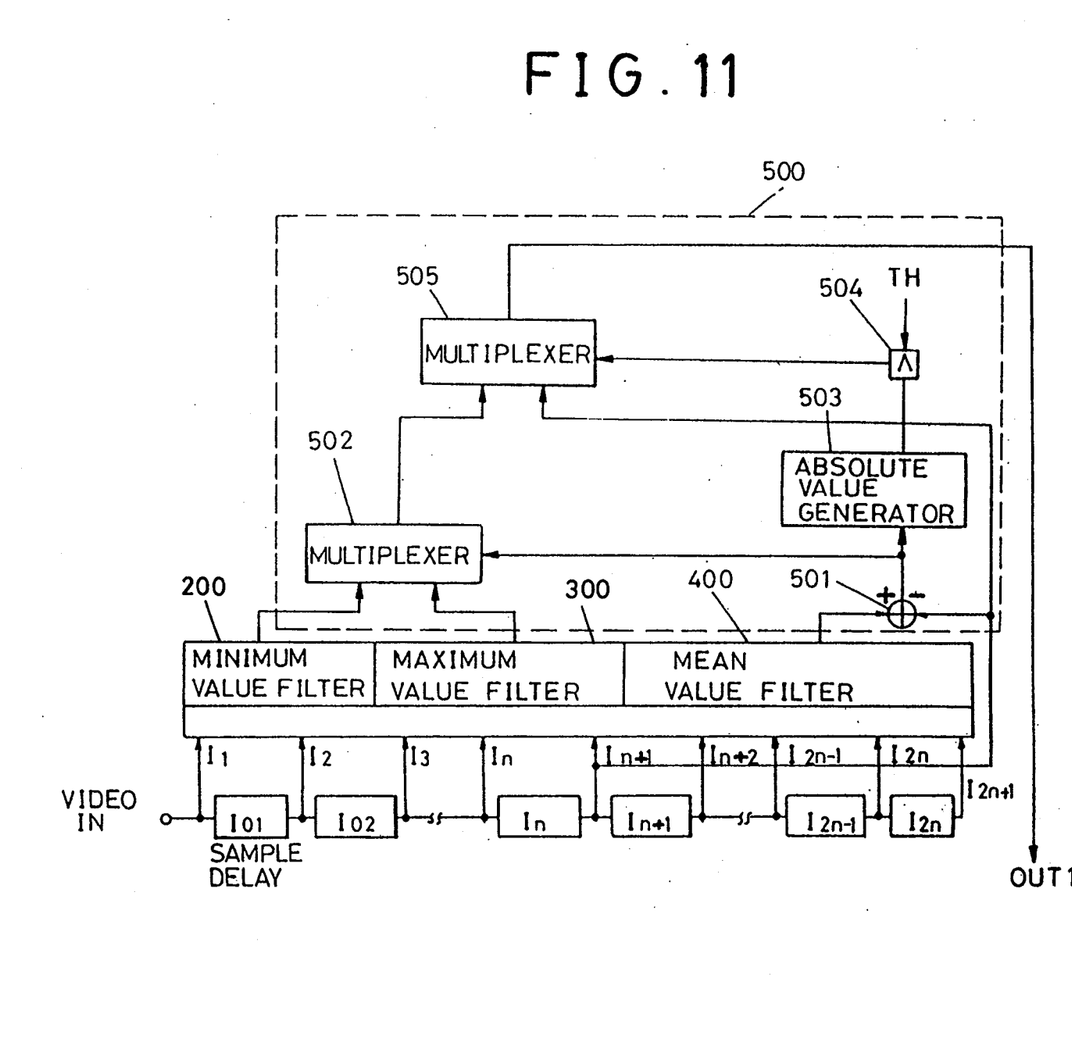
FIG. 11 is a block diagram of an apparatus for enhancing a transient edge of a video signal n accordance with a second embodiment of the present invention.

Referring to FIG. 11, there is shown a block diagram of an apparatus for enhancing a transient edge of a video signal in accordance with a second embodiment of the present invention. Parts in this drawing are substantially the same as those in FIG. 5. Therefore, like reference numerals designate like parts.

Similarly to that in the first embodiment of the present invention, the 2n sample delays 101 to 12n are adapted to sequentially delay the original pixel value I1 of the video signal inputted therein by one sample and output the 2n pixel values I2 to I2n+1 of the video signal, where n is the positive number.

The minimum value filter 200 is adapted to obtain the minimum value MIN of the original pixel value I1 and the 2n−1 pixel values I2 to In and In+2 to I2n+1 from the sample delays 101 to 1n−1 and 1n+1 to 12n except the nth pixel value In+1 from the sample delay 1n.

The maximum value filter 300 is adapted to obtain the maximum value MAX of the original pixel value I1 and the 2n−1 pixel values I2 to In and In+2 to I2n+1 from the sample delays 101 to 1n−1 and 1n+1 to 12n except the nth pixel value In+1 from the sample delay 1n.

The mean value filter 400 is adapted to obtain the mean value MEAN of the original pixel value I1 and the 2n−1 pixel values I2 to In and In+2 to I2n+1 from the sample delays 101 to 1n−1 and 1n+1 to 12n except the nth pixel value In+1 from the sample delay 1n.

The transient edge control circuit 500 is adapted to obtain the difference between the nth pixel value In+1 from the sample delay 1n and the mean value MEAN from the mean value filter 400, generate the absolute value of the obtained difference, compare the generated absolute value with the threshold value TH, discriminate the transient edge of the video signal in accordance with the compared result and enhance the discriminated transient edge on the basis of the minimum value MIN from the minimum value filter 200 and the maximum value MAX from the maximum value filter 300 to reduce the width of the transient edge.

Here, the transient edge control circuit 500 has the same construction as that of the first embodiment of the present invention.

In operation, upon receiving the video signal, the 2n sample delays 101 to 12n sequentially delay the original pixel value I1 of the received video signal by one sample and output the 2n pixel values I2 to I2n+1 of the video signal, where n is the positive number. The minimum value filter 200 obtains the minimum value MIN of the original pixel value I1 and the 2n−1 pixel values I2 to In and In+2 to I2n+1 from the sample delays 101 to 1n−1 and 1n+1 to 12n except the nth pixel value In+1 from the sample delay 1n. The maximum value filter 300 obtains the maximum value MAX of the original pixel value I1 and the 2n−1 pixel values I2 to In and In+2 to I2n+1 from the sample delays 101 to 1n−1 and 1n+1 to 12n except the nth pixel value In+1 from the sample delay 1n. The mean value filter 400 obtains the mean value MEAN of the original pixel value I1 and the 2n−1 pixel values I2 to In and In+2 to I2n+1 from the sample delays 101 to 1n−1 and 1n+1 to 12n except the nth pixel value In+1 from the sample delay 1n.

In the same manner as that in the first embodiment of the present invention, the nth pixel value In+1 from the sample delay 1n, the minimum value MIN from the minimum value filter 200, the maximum value MAX from the maximum value filter 300 and the mean value MEAN from the mean value filter 400 are applied to the transient edge control circuit 500.

In the transient edge control circuit 500, the subtracter 501 subtracts the nth pixel value In+1 from the sample delay 1n from the mean value MEAN from the mean value filter 400 and the multiplexer 502 selects one of the minimum value MIN from the minimum value filter 200 and the maximum value MAX from the maximum value filter 300 according to the sign of the output value from the subtracter 501.

Namely, when the mean value MEAN from the mean value filter 400 is greater than the nth pixel value In+1 from the sample delay In as in the region A of FIG. 8, the multiplexer 502 selects the minimum value MIN from the minimum value filter 200 according to the plus (+) sign of the output value from the subtracter 501. On the contrary, when the mean value MEAN from the mean value filter 400 is not greater than the nth pixel value In+1 from the sample delay in as in the region B of FIG. 8, the multiplexer 502 selects the maximum value MAX from the maximum value filter 300 according to the minus (−) sign of the output value from the subtracter 501. In this manner, the transient edge to be enhanced is reduced in width as shown in FIG. 7.

On the other hand, the absolute value of the output value from the subtracter 501 is obtained by the absolute value generator 503 and then compared with the threshold value TH by the comparator 504. The multiplexer 505 selects one of the nth pixel value In+1 from the sample delay In and the output value from the multiplexer 502 in response to the output signal from the comparator 504.

Namely, if |MEAN −In+1| <TH, the output value out1 from the multiplexer 505 is the nth pixel value In+1 from the sample delay 1n. Also, if |MEAN−In+1| >TH and In+1>MEAN, the output value out1 from the multiplexer 505 is the maximum value MAX from the maximum value filter 300. Also, if |MEAN−In+1| >TH and In+1<MEAN, the output value out1 from the multiplexer 505 is the minimum value MIN from the minimum value filter 200.

For example, in the case were the video signal has the window size of 7 as shown in FIG. 8, the transient edge thereof is enhanced with the width reduced as shown in FIG. 9.

Figure 12:
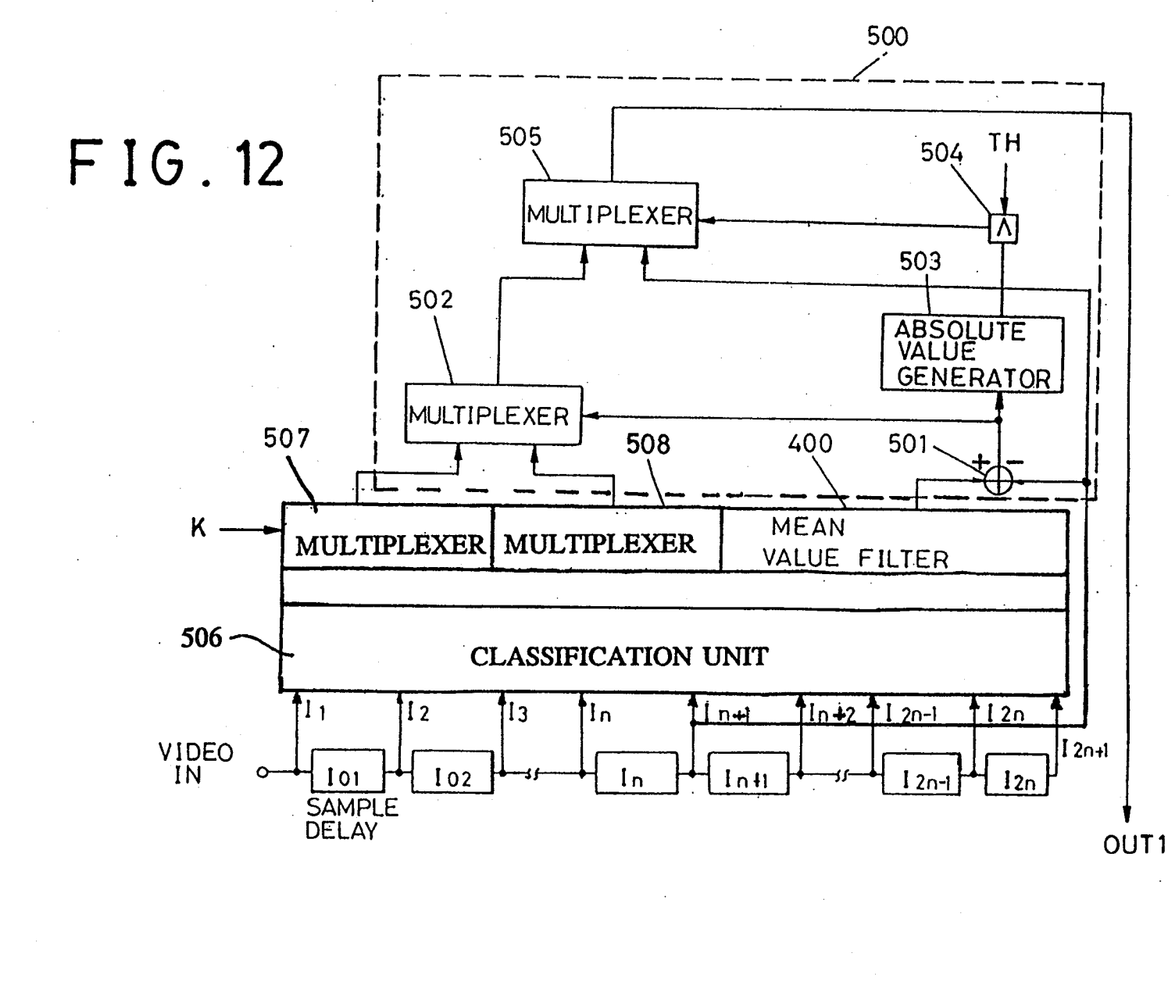
FIG. 12 is a block diagram of an apparatus for enhancing a transient edge of a video signal in accordance with a third embodiment of the present invention.

Referring to FIG. 12, there is shown a block diagram of an apparatus for enhancing a transient edge of a video signal in accordance with a third embodiment of the present invention. The construction of this drawing is substantially the same as that of FIG. 11, with the exception that a classification unit 506 and multiplexers 507 and 508 are employed instead of the minimum value filter 200 and the maximum value filter 300. Therefore, like reference numerals designate like parts.

The classification unit 506 is adapted to classify the original pixel value I1 and the 2n pixel values I2 to I2n+1 from the sample delays 101 to 12n in the order of their magnitude.

The multiplexer 507 is adapted to receive the original pixel value I1 and the pixel values I2 to In delayed before the nth pixel value from the classification unit 506, select one of the received pixel values in response to a select factor K and output the selected pixel value to the multiplexer 502 in the transient edge control circuit 500.

The multiplexer 508 is adapted to receive the pixel values In+2 to I2n+1 delayed after the nth pixel value from the classification unit 506, select one of the received pixel values in response to the select factor K and output the selected pixel value to the multiplexer 502 in the transient edge control circuit 500.

In operation, upon receiving the video signal, the 2n sample delays 101 to 12n sequentially delay the original pixel value I1 of the received video signal by one sample and output the 2n pixel values I2 to I2n+1 of the video signal, where n is the positive number. The original pixel value I1 and the 2n pixel values I2 to I2n+1 from the sample delays 101 to 12n are classified in the order of their magnitude by the classification unit 506 and then applied to the multiplexers 507 and 508 except the nth pixel value In+1 from the sample delay 1n. Namely, the original pixel value I1 and the pixel values I2 to In delayed before the nth pixel value from the classification unit 506 are applied to the multiplexer 507 and the pixel values In+2 to I2n+1 delayed after the nth pixel value from the classification unit 506 are applied to the multiplexer 508.

In response to the select factor K, the multiplexer 507 selects one of the original pixel value I1 and the pixel values I2 to In delayed before the nth pixel value from the classification unit 506 and outputs the selected pixel value to the multiplexer 502 in the transient edge control circuit 500. At the same time, in response to the select factor K, the multiplexer 508 selects one of the pixel values In+2 to I2n+1 delayed after the nth pixel value from the classification unit 506 and outputs the selected pixel value to the multiplexer 502 in the transient edge control circuit 500.

For example, if the select factor is 1, the pixel values I1 and I2n+1 from the multiplexers 507 and 508 are applied to the multiplexer 502, respectively. Also, if the select factor is 2, the pixel values I2 and I2n from the multiplexers 507 and 508 are applied to the multiplexer 502, respectively.

Figure 13:
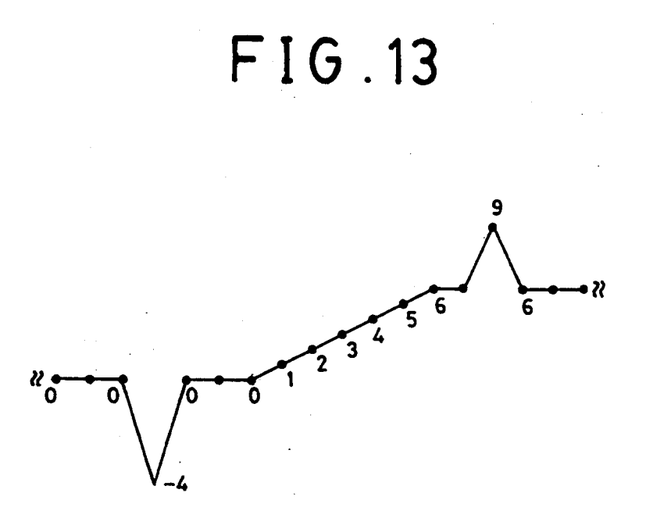
FIG. 13 is a waveform diagram illustrating pixel values of a video signal which is applied to the third embodiment of the present invention.
Figure 14:
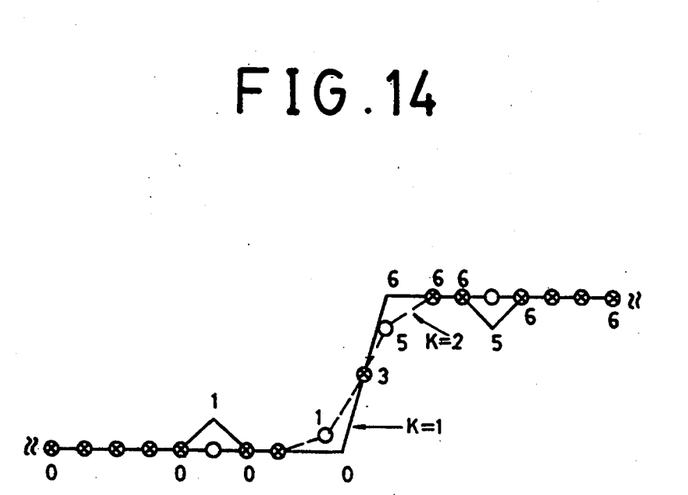
FIG. 14 is a waveform diagram illustrating pixel values of the video signal in FIG. 13 in which a transient edge is enhanced by the transient edge enhancement apparatus in FIG. 12.

In the same manner as that of the first embodiment as shown in FIG. 5, the transient edge of the video signal is enhanced and the spark noises are removed from the video signal. On the basis of the select factor K, the transient edge of the video signal as shown in FIG. 13 is enhanced as shown in FIG. 14.

As apparent from the above description, according to the present invention, the transient edge is enhanced with the width reduced, resulting in an increase in an enhancement frequency band of the video signal. Also, the spark noises are detected from the video signal and then removed. Therefore, a distinct picture can be obtained.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for enhancing a transient edge of a video signal comprising:
   sample delay means for sequentially delaying an original pixel value of the video signal inputted therein by one sample and outputting 2n pixel values of the video signal, where n is a positive number;
   minimum value filtering means for obtaining the minimum value of the original pixel value and the 2n−1 pixel values from said sample delay means except the nth pixel value therefrom;
   maximum value filtering means for obtaining the maximum value of the original pixel value and the 2n−1 pixel values from said sample delay means except the nth pixel value therefrom;
   first mean value filtering means for obtaining the mean value of the original pixel value and the 2n−1 pixel values from said sample delay means except the nth pixel value therefrom; and
   transient edge control means for obtaining a difference between the nth pixel value from said sample delay means and the mean value from said first mean value filtering means, generating an absolute value of the obtained difference, comparing the generated absolute value with a threshold value, discriminating the transient edge of the video signal in accordance with a compared result and enhancing the discriminated transient edge on the basis of the minimum value from said minimum value filtering means and the maximum value from said maximum value filtering means to reduce a width of the transient edge.

2. An apparatus for enhancing a transient edge of a video signal, as set forth in claim 1, wherein said transient edge control means outputs the nth pixel value from said sample delay means if the absolute value of the difference between the nth pixel value from said sample delay means and the mean value from said first, mean value filtering means is smaller than the threshold value, outputs the maximum value from said maximum value filtering means if the absolute value of the difference between the nth pixel value from said sample delay means and the mean value from said first mean value filtering means is greater than the threshold value and the nth pixel value from said sample delay means is greater than the mean value from said first mean value filtering means, and outputs the minimum value from said minimum value filtering means if the absolute value of the difference between the nth pixel value from said sample delay means and the mean value from said first mean value filtering means is greater than the threshold value and the nth pixel value from said sample delay means is smaller than the mean value from said first mean value filtering means.

3. An apparatus for enhancing a transient edge of a video signal, as set forth in claim 1, wherein said transient edge control means includes:
   a subtracter for subtracting the nth pixel value from said sample delay means from the mean value from said first mean value filtering means;
   a first multiplexer for selecting one of the minimum value from said minimum value filtering means and the maximum value from said maximum value filtering means according to a sign of an output value from said subtracter;
   an absolute value generator for generating an absolute value of the output value from said subtracter;
   a comparator for comparing the absolute value from said absolute value generator with the threshold value; and
   a second multiplexer for selecting one of the nth pixel value from said sample delay means and an output value from said first multiplexer in response to an output signal from said comparator.

4. An apparatus for enhancing a transient edge of a video signal, as set forth in claim 1, Further comprising:
   second mean value filtering means for obtaining the mean value of the nth pixel value and adjacent pixel values which are before and after the nth pixel value from said sample delay means;
   median filtering means for obtaining a median of the nth pixel value and the adjacent pixel values from said sample delay means;
   noise removal control means for performing a comparison operation of the mean value from said second mean value filtering means, the median from said median filtering means and the nth pixel value from said sample delay means with respect to first to fourth constants, discriminating spark noises from the video signal in accordance with a compared result and removing the discriminated spark noises; and
   output means having a multiplexer, said multiplexer selectively outputting one of an output value from said transient edge control means and the median from said median filtering means in response to an output signal from said noise removal control means.

5. An apparatus for enhancing a transient edge of a video signal, as set forth in claim 4, wherein said noise removal control means discriminates the spark noises from the video signal by discriminating whether the nth pixel value from said sample delay means, the mean value from said second mean value filtering means and the median from said median filtering means satisfy the following equation:

$$In+1 > MEAN3 + A1 > MEDIAN3 + A2 \text{ or}$$
$$In+1 < MEAN3 - B1 < MEDIAN3 - B2$$

where, In+1 is the nth pixel value from said sample delay means, MEAN3 is the mean value from said second mean value filtering means, MEDIAN3 is the median from said median filtering means, and A1, A2, B1 and B2 are the first to fourth constants.

6. An apparatus for enhancing a transient edge of a video signal, as set forth in claim 4, wherein said noise removal control means includes:
   first comparison means for performing the comparison operation of the mean value from said second mean value filtering means, the median from said median filtering means and the nth pixel value from said sample delay means with respect to the first and second constants;

second comparison means for performing the comparison operation of the mean value from said second mean value filtering means, the median from said median filtering means and the nth pixel value from said sample delay means with respect to the third and fourth constants; and logical output means for logically combining output signals from said first and second comparison means.

7. An apparatus for enhancing a transient edge of a video signal, as set forth in claim 6, wherein said first comparison means includes:
  a first adder for adding the first constant from the mean value from said second mean value filtering means;
  a second adder for adding the second constant from the median from said median filtering means;
  a first comparator for comparing an output value from said first adder with the nth pixel value from said sample delay means;
  a second comparator for comparing an output value from said second adder with the nth pixel value from said sample delay means;
  a third comparator for comparing the output values from said first and second adders with each other; and
  an AND pate for ANDing output signals from said first to third comparators.

8. An apparatus for enhancing a transient edge of a video signal, as set forth in claim 6, wherein said second comparison means includes:
  a first subtracter for subtracting the third constant from the mean value from said second mean value filtering means;
  a second subtracter for subtracting the fourth constant from the median from said median filtering means;
  a first comparator for comparing an output value from said first subtracter with the nth pixel value from said sample delay means;
  a second comparator for comparing an output value from said second subtracter with the nth pixel value from said sample delay means;
  a third comparator for comparing the output values from said first and second subtracters with each other; and
  an AND gate for ANDing output signals from said first to third comparators.

9. An apparatus for enhancing a transient edge of a video signal, as set forth in claim 6, wherein said logical output means includes:
  an OR gate for ORing the output signals from said first and second comparison means.

10. An apparatus for enhancing a transient edge of a video signal, as set forth in claim 1, wherein first and second multiplexing means are employed instead of said minimum value filtering means and said maximum value filtering means, respectively, said first multiplexing means selecting one of the original pixel value and the pixel values delayed before the nth pixel value from said sample delay means in response to a select factor and outputting the selected pixel value to said transient edge control means, said second multiplexing means selecting one of the pixel values delayed after the nth pixel value from said sample delay means in response to the select factor and outputting the selected pixel value to said transient edge control means.

11. A method of enhancing a transient edge of a video signal, comprising the steps of:
  (a) sequentially delaying an original pixel value of the 10 video signal by one sample to output 2n pixel values of the video signal, where n is a positive number, and obtaining a minimum value, a maximum value and a mean value of the original pixel value and the 2n pixel values; and
  (b) obtaining a difference between the nth pixel value and the mean value obtained at said step (a), generating an absolute value of the obtained difference, comparing the generated absolute value with a threshold value, discriminating the transient edge of the video signal in accordance with a compared result and enhancing the discriminated transient edge on the basis of the minimum value and the maximum value obtained at said step (a) to reduce a width of the transient edge.

12. A method of enhancing a transient edge of a video signal, as set forth in claim 11, further comprising the steps of:
  (c) obtaining the mean value and a median of the nth pixel value and adjacent pixel values which are before and after the nth pixel value obtained at said step (a);
  (d) performing a comparison operation of the mean value and the median obtained at said step (c) and the nth pixel value obtained at said step (a) with respect to first to fourth constants, discriminating spark noises from the video signal in accordance with a compared result and removing the discriminated spark noises; and
  (e) selectively outputting one of an output value from said step (b) and the median obtained at said step (c) in response to an output signal from said step (d).

* * * * *